United States Patent Office 3,538,631
Patented Nov. 10, 1970

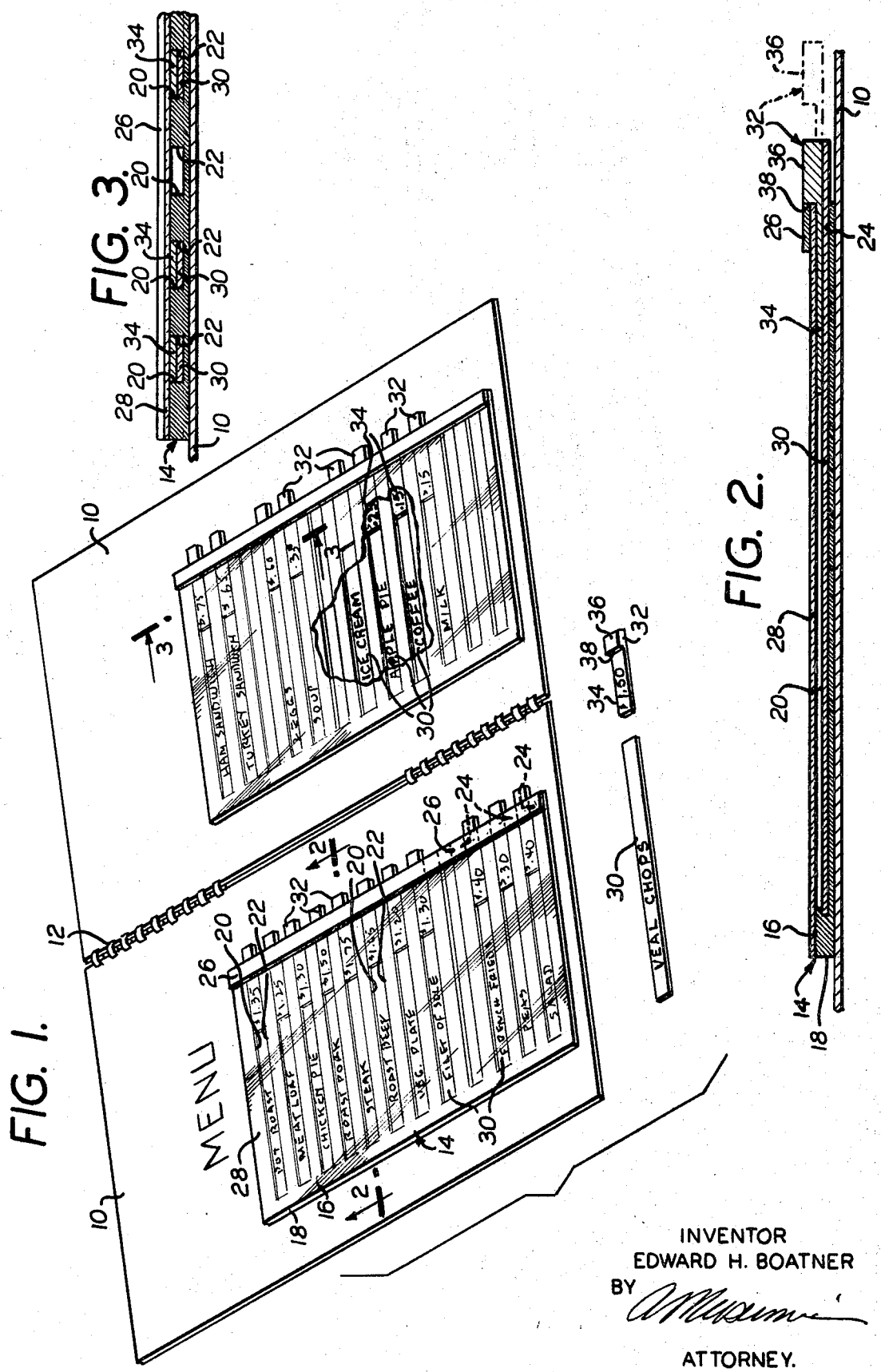

3,538,631
VARIABLE FORMAT RESTAURANT MENU
Edward Hammond Boatner, 76 W. 69th St.,
New York, N.Y. 10023
Filed July 23, 1968, Ser. No. 746,963
Int. Cl. G09f 11/30
U.S. Cl. 40—64
1 Claim

ABSTRACT OF THE DISCLOSURE

A restaurant menu wherein individual food items and the prices therefor are marked on strips and tabs which are interchangeable to permit variation of the menu format. The menu is structurally formed of a flat base member with a frame mounted thereon. The strips and tabs are interchangeably removably mounted within the frame. The menu is particularly adaptable to be manufactured in kit form comprising designations uniquely suited to a particular restaurant.

---

The present invention pertains to a menu for use in a commercial restaurant, and more particularly to a structure for a menu enabling interchangeability of listed items.

Commercial restaurants normally make available a rather large and changeable variety of foods and prepared meals. On any particular day, the menu used in such restaurants must provide an indication of the various food and drink items available on that day as well as the individual price of each item. Since the number, type and specific designation of items available will usually vary widely from day to day, and from meal to meal each day, it becomes necessary to alter, change or completely replace the menu periodically.

The necessity for periodically providing a different menu which sets forth an accurate indication of the designation and price of all food items available for a particular period or meal can be a time-consuming chore which could involve a more-than-nominal expense. The expense of periodically providing a different menu can become quite significant when it is desired to utilize a menu having decorative or aesthetic value which will enhance the attractiveness of the food items listed, and which will contribute advantageously and beneficially to the image, prestige and atmosphere of the restaurant establishment. A menu which is expensive in appearance and materials, and which comprises an artistic and imaginative design and configuration could become prohibitively expensive if it had to be replaced each day.

Accordingly, it is an object of the present invention to provide a restaurant menu featuring interchangeability of listed items and prices.

It is a further object of the invention to provide a structure for a restaurant menu whereby the menu may be provided in the form of a kit which includes interchangeable components to enable repeated revision of the menu format.

A better understanding of the invention may be had by reference to the following detailed description of a preferred embodiment thereof taken in connection with the accompanying drawings wherein:

FIG. 1 is an isometric view showing the assembled menu of the invention together with individual removable portions thereof;

FIG. 2 is a sectional view taken along the line 2—2 of FIG. 1; and

FIG. 3 is a sectional view taken along the line 3—3 of FIG. 1.

In the drawing, FIG. 1 shows the menu assembly of the present invention as comprising a flat, planar base member 10 made of any appropriate material which will provide adequate stiffness to support other members of the structural assembly of the present invention. The base member 10 may be provided in two sections with a hinge 12 therebetween allowing the menu to open and close in the manner of a book.

Mounted upon base member 10, by glueing or any appropriate means, is an integral frame 14 having a front wall 16 and a side wall 18. Frame 14 is basically planar in configuration and comprises a uniform thickness equivalent to the thickness of side wall 18.

Frame 14 also comprises a plurality of horizontal open ended slits, each slit defined by an upper wall 20 and a parallel lower wall 22. Each slit is open ended at one side only, said open ends being defined between end portions 24 of front wall 16. Also, the slits are formed of uniform widths, by providing equal spacing between each upper and lower wall 20, 22, and of equivalent horizontal lengths. Overlying portions 24 of front wall 16 is a longitudinal strip 26 which is affixed to portions 24 by glueing or other appropriate means. A transparent sheet 28 of plastic or other appropriate material may be provided to overlie front wall 16 of frame 14.

The individual food or drink items for sale are printed or otherwise appropriately marked upon horizontal strips 30, while the price of each item is marked upon a price tab 32. Strips 30 and price tabs 32 are removably insertable between walls 20 and 22 through the open ends between portions 24 of the horizontal slits in frame 14. Strips 30 and tabs 32 are placed with their printed sides facing the viewer so that each item and the price therefor may be visible through transparent sheet 28.

Horizontal strips 30 may be made of plastic or other suitable material enabling marking thereon of food item designations. Strips 30 are of a length equivalent to the length of walls 20 and 22, and of a width slightly less than the distance between walls 20 and 22, which are parallel to each other.

Price tabs 32 are likewise made of plastic or other suitable material, and they are formed in step-like fashion with a thinner section 34 and a thicker section 36.

The combined thicknesses of a strip 30 and of a thinner section 34 are equal or slightly greater than the thickness of side wall 18. The distance between the underside of longitudinal strip 26 and the surface of base member 10 is equivalent to the thickness of frame 14.

In assembling the menu for viewing by a customer the strip 30 is first placed into the horizontal slits between walls 20 and 22. As previously stated, strip 30 will be of such a length that it will be coextensive with walls 20 and 22 terminating in alignment with the right hand end thereof as viewed in the drawing. Subsequent to insertion of strip 30, an appropriate price tab 32 may be selected and inserted over the right hand end of strip 30, with the thinner section 34 placed between the upper surface of strip 30 and the underside of longitudinal strip 26. Upstanding wall 38 of tab 32 acts as a stop member to insertion of tab 32 by abuting longitudinal strip 26 when the tab 32 is fully inserted between walls 20 and 22. Also, thicker section 36 operates to facilitate insertion and removal of tab 32 by providing gripping means therefor. When tab 32 is inserted between walls 20 and 22, it will extend a short distance beyond longitudinal strip 26 sufficient to permit viewing of the price information printed thereon. Due to the thickness dimensions of strip 30 and thinner section 34, these members will be firmly held between base member 10 and strip 26 by frictional engagement therewith. Removal and replacement of strips 30 and tabs 32 may be easily accomplished by gripping thicker section 36 and applying appropriate force to slide the tab 32 out of frame 14. Strip 30 will then be loosely held therein and will easily slide out. Accordingly, the menu of the present invention may be quickly and easily revised and amended as frequently as desired merely by removal and replacement of appropriate strips 30 and tabs 32.

The present invention contemplates provision of the various structural elements of the menu in kit form. Thus, a group or series of horizontal strips 30 and price tabs 32 could be printed with a predetermined format of items and prices which could be interchanged with any desired degree of frequency. Each kit could be assembled to comprise designations which would be uniquely suited to a particular restaurant and which would reflect the gamut of food and drink items and prices associated therewith.

It will be apparent that by utilization of the present invention the base member 10 and the frame 14 mounted thereon may be continuously in use and need not be changed or discarded when changing the menu format. Accordingly, these items may be attractively embellished and expensively appointed without waste, since replacement of these portions of the assembly may be avoided when revising the menu.

What is claimed is:
1. An arrangement for a restaurant menu comprising:
   a planar base member of rigid material,
   a frame mounted upon said base member, said frame comprising a plurality of parallel horizontally directed walls defining therebetween a plurality of parallel open-ended slits,
   a plurality of elongated strips with food item designations marked thereon,
   a plurality of tabs with price designations marked thereon,
   a longitudinal strip member firmly affixed to said frame overlying the open end of said slits,
   said strips and said tabs being interchangeably removably insertable into said slits between said parallel horizontally directed walls, with a single strip and a single tab comprising a combined thickness at least as great as the space between said longitudinal strip member and said planar base member whereby said strips and said tabs are held firmly in place within said slits by frictional force when placed therein in overlying relationship at a point between said longitudinal strip and said planar base member, and
   gripable means integrally formed upon said tabs and extending exteriorly of said slits to facilitate placement of said tabs to and from said slits.

References Cited
UNITED STATES PATENTS

| | | | |
|---|---|---|---|
| 224,684 | 2/1880 | Harris | 40—64 |
| 297,094 | 4/1884 | Sutton | 40—64 X |
| 391,765 | 10/1888 | Terrill | 40—63 |
| 396,716 | 1/1889 | Terrill | 40—63 |
| 485,229 | 11/1892 | Reed | 40—63 X |

FOREIGN PATENTS

| | | |
|---|---|---|
| 14,920 | 7/1896 | Great Britain. |

EUGENE R. CAPOZIO, Primary Examiner

W. J. CONTRERAS, Assistant Examiner

U.S. Cl. X.R.

40—5